US009224353B2

(12) United States Patent
Kasuga et al.

(10) Patent No.: US 9,224,353 B2
(45) Date of Patent: Dec. 29, 2015

(54) LIQUID CRYSTAL MONITOR USING DC-DC CONVERTER

(75) Inventors: Hiroyuki Kasuga, Tokyo (JP); Takuya Nakazawa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 309 days.

(21) Appl. No.: 13/880,322

(22) PCT Filed: Oct. 22, 2010

(86) PCT No.: PCT/JP2010/068675
§ 371 (c)(1),
(2), (4) Date: Jun. 21, 2013

(87) PCT Pub. No.: WO2012/053094
PCT Pub. Date: Apr. 26, 2012

(65) Prior Publication Data
US 2013/0293807 A1    Nov. 7, 2013

(51) Int. Cl.
*G05F 1/00* (2006.01)
*H05B 37/02* (2006.01)
*G09G 3/36* (2006.01)
*G02F 1/133* (2006.01)

(52) U.S. Cl.
CPC .............. *G09G 3/3696* (2013.01); *G02F 1/133* (2013.01); *G09G 3/36* (2013.01); *G09G 2330/021* (2013.01); *G09G 2330/028* (2013.01)

(58) Field of Classification Search
CPC .............................. G09G 3/3696; G02F 1/133
USPC .......................... 315/291, 294, 295, 307, 312
See application file for complete search history.

(56) References Cited

U.S. PATENT DOCUMENTS

| 8,247,975 | B2* | 8/2012 | Yoo et al. .......................... 315/51 |
| 8,446,402 | B2* | 5/2013 | Sang et al. ..................... 345/212 |
| 2005/0242789 | A1 | 11/2005 | Kang |
| 2007/0205977 | A1* | 9/2007 | Kim .............................. 345/102 |
| 2008/0088550 | A1* | 4/2008 | Kim et al. ........................ 345/82 |

(Continued)

FOREIGN PATENT DOCUMENTS

| CN | 1611998(A) | 5/2005 |
| CN | 1741361(A) | 3/2006 |

(Continued)

OTHER PUBLICATIONS

International Search Report in PCT/JP2010/068675 dated Feb. 1, 2011 (English Translation Thereof).

(Continued)

*Primary Examiner* — Kenneth B Wells
(74) *Attorney, Agent, or Firm* — McGinn IP Law Group, PLLC

(57) ABSTRACT

A liquid crystal monitor includes a first voltage conversion circuit (e.g. a DC/DC converter), which converts an external DC voltage into a first internal DC voltage supplied to CPU circuitry, and a second voltage conversion circuit, which converts the external DC voltage into a second internal DC voltage for driving a backlight of a liquid crystal panel. The external DC voltage is set proximate to a center value between the first internal DC voltage and the second internal DC voltage. This allows the liquid crystal monitor to be equipped with a battery unit producing a single external DC voltage, thus reducing weight compared to a conventional liquid crystal monitor.

14 Claims, 3 Drawing Sheets

(56) References Cited

U.S. PATENT DOCUMENTS

2009/0058315 A1* 3/2009 Baeumle .................. 315/291
2011/0158051 A1* 6/2011 Hsu ................................ 368/10

FOREIGN PATENT DOCUMENTS

| | | |
|---|---|---|
| EP | 1 450 589 A1 | 8/2004 |
| JP | 1-130116 | 9/1989 |
| JP | 4-53924 A | 2/1992 |
| JP | 6-251880 A | 9/1994 |
| JP | 11-275854 A | 10/1999 |
| JP | 2000-029025 A | 1/2000 |
| JP | 2000-305524 A | 11/2000 |
| JP | 2005-202171 A | 7/2005 |
| JP | 2006-301265 A | 11/2006 |
| JP | 2009-164397(A) | 7/2009 |

OTHER PUBLICATIONS

Chinese Office Action dated Dec. 11, 2014 with a partial English translation thereof.
Chinese Office Action dated Jul. 1, 2015 with a partial English translation.

* cited by examiner

LIQUID CRYSTAL MONITOR USING DC-DC CONVERTER

TECHNICAL FIELD

The present invention relates to a liquid crystal monitor (i.e. a liquid crystal display).

BACKGROUND ART

Conventionally, liquid crystal monitors for displaying video signals, given from an external device, on liquid crystal screens have been frequently used as video display devices.

Generally speaking, liquid crystal monitors are driven based on power, supplied from external power sources, which is needed to perform image processing on video input signals supplied from external devices and to display images on display screens.

FIG. 3 is a diagram showing the configuration of a conventional liquid crystal monitor 110. For example, the liquid crystal monitor 110 includes a power circuit 305, a power supply block A 302, a power supply block B 303, and a liquid crystal panel 4.

The power circuit 305 includes power output circuits 306 and 307. The power output circuit 306 converts an AC voltage (e.g. 100 V to 240 V), which is supplied from an outlet socket via a socket plug 201 and an AC (Alternating Current) power supply line 300, into a DC (Direct Current) voltage, which is supplied to the power supply block B 303, e.g. a DC voltage of 19 V, thus supplying it to the power supply block B 303. Additionally, the power output circuit 307 converts the foregoing AC voltage into a DC voltage which can be supplied to the power supply block A 302, e.g. a DC voltage having a value of 5 V, thus supplying it to the power supply block A 302.

The power supply block A 302 includes a DC/DC converter 18, a CPU circuitry 11, a video processing circuit 12, and a liquid crystal display control circuit 13.

The DC/DC converter 18 transforms or reduces a DC voltage of 5 V, which is supplied from the power output circuit 307, so as to generate another DC voltage, e.g. a DC voltage of 1.9 V, thus supplying the generated DC voltage of 1.9 V to the CPU (Central Processing Unit) circuitry 11 via the DC power supply line 207. The CPU circuitry 11 has a plurality of semiconductor chips, each of which includes a chip set having a CPU and a memory and each of which operates based on a driving voltage of 1.9 V.

Additionally, the DC/DC converter 18, the video processing circuit 12, and the liquid crystal display control circuit 13 are each supplied with a DC voltage of 5 V from the power output circuit 307. Similarly, the CPU circuitry 11 is supplied with a DC voltage of 5 V from the power output circuit 307.

The video processing circuit 12 performs image processing, for displaying images on the liquid crystal panel 4, on video input signals, which are supplied from an external device via a video input signal line 101, based on a video control signal which is supplied from the CPU circuitry 11 via a control signal line 209. Subsequently, the video processing circuit 12 outputs video data, going through image processing, to the liquid crystal display circuit 13 via a video signal line 210.

The liquid crystal control circuit 13 controls the liquid crystal display device 15, arranged inside the liquid crystal panel 4, based on video data supplied thereto via a liquid crystal display control line 213 while supplying a DC voltage of 5 V to the liquid crystal display device 15 via a power supply line 214. The liquid crystal display device 15 displays images, based on video data supplied thereto, by controlling liquid crystal elements.

The power supply block B 303 includes a backlight control device 14. The backlight control device 14 is supplied with a DC voltage of 19 V from the power output circuit 306 via a DC power supply line 308 and supplied with a backlight control signal via a backlight control signal line 208.

The backlight control device 14 includes a voltage conversion circuit (e.g. a DC/DC converter) therein and boosts a DC voltage of 19 V supplied thereto to a voltage ranging from 40 V to 50 V so as to supply a DC voltage of 40 V to the backlight 16 as a driving voltage via a backlight power supply line 212 while controlling the backlight 16 based on a backlight control signal input thereto via a backlight control output signal line 211.

That is, the liquid crystal monitor converts an externally supplied voltage into a DC voltage whose value is needed to drive each of internal circuit blocks by way of the internal power circuit thereof (see Patent Literature 1).

In the liquid crystal monitor of FIG. 3, for example, a power circuit generates a plurality of DC voltages used for various circuits of the liquid crystal monitor, based on an AC voltage supplied thereto via the socket plug 201 and the AC power supply line 300, thus supplying them to various circuits.

When an external battery is provided to supply a DC voltage used for each internal circuit, however, it is necessary to supply a plurality of DC voltages used for various internal circuits. For this reason, a conventional liquid crystal monitor needs to install a plurality of batteries therein; hence, a conventional liquid crystal monitor has a drawback in that it cannot be used for a display device for a portable device because the weight thereof may increase by installing a plurality of batteries therein.

CITATION LIST

Patent Literature

Patent Literature 1: Japanese Patent Application Publication No. 2000-29025

SUMMARY OF INVENTION

Technical Problem

A problem to be solved is a weight of a liquid crystal monitor which may increase due to the necessity of installing a plurality of batteries for producing a plurality of DC voltages having different values when a plurality of DC voltages having different values used for various internal circuits is provided externally.

Solution to Problem

The present invention provides a liquid crystal monitor including a first voltage conversion circuit for converting an external DC voltage, externally supplied thereto, into a first internal DC voltage supplied to one circuit inside the liquid crystal monitor and a second voltage conversion circuit for converting the external DC voltage into a second internal DC voltage for driving a backlight of a liquid crystal panel.

A liquid crystal monitor of the present invention further includes a third voltage conversion circuit for converting the first internal DC voltage into a third internal DC voltage supplied to the other circuit inside the liquid crystal monitor.

A liquid crystal monitor of the present invention is characterized in that the first voltage conversion circuit reduces the external DC voltage to produce the first internal DC voltage; the second voltage conversion circuit boosts the external DC voltage to produce the second internal DC voltage; and the third voltage conversion circuit reduces the first internal DC voltage to produce the third internal DC voltage.

A liquid crystal monitor of the present invention is characterized in that the external DC voltage, the first internal DC voltage, the second internal DC voltage, and the third internal DC voltage have a relationship in which the second internal DC voltage>the external DC voltage>the first internal DC voltage>the third internal DC voltage.

A liquid crystal monitor of the present invention is supplied with the external DC voltage from a battery unit outputting a single voltage.

A liquid crystal monitor of the present invention is supplied with the external DC voltage from an AC adaptor.

A liquid crystal monitor of the present invention further includes a voltage monitoring circuit which detects a value of the external DC voltage so as to compare the detected value with a predetermined threshold voltage and which outputs a voltage reduction signal, indicating a voltage reduction, to the other circuit when the detected value is lower than the threshold voltage, wherein the other circuit, supplied with the voltage reduction signal, displays an image, indicating a low value of the external DC voltage, on a liquid crystal panel by way of an OSD function.

Advantageous Effects of Invention

A liquid crystal monitor of the present invention is designed to produce a plurality of internal DC voltages used for various internal circuits based on an external DC voltage having a single value, externally supplied thereto, by way of internal voltage conversion circuits; hence, when an external battery unit is used to directly supply a DC voltage, it is unnecessary to externally and directly supply a plurality of DC voltages having different values; this allows for installation of a single battery unit, thus realizing an advantageous effect not increasing the weight of a liquid crystal monitor, installing a battery unit, compared to the weight of a conventional liquid crystal monitor.

DESCRIPTION OF EMBODIMENTS

A liquid crystal monitor of the present invention (i.e. a battery-driven liquid crystal monitor), externally supplied with a DC voltage having a single value, is designed such that internal voltage conversion circuits (i.e. DC/DC converters) produce a plurality of DC voltages used for various internal circuits; this allows for external installation of a single battery unit, thus realizing a weight reduction in a liquid crystal monitor.

Additionally, a liquid crystal display of the present invention is designed such that a value of a DC voltage externally supplied thereto is set to or set proximate to a center value of voltages, which need to be finally boosted or reduced; this may efficiently convert the externally supplied voltage into a plurality of voltages, used for various internal circuits, thus realizing a reduction of power consumption due to voltage conversion while increasing a driving time with a battery unit.

Figure 1:
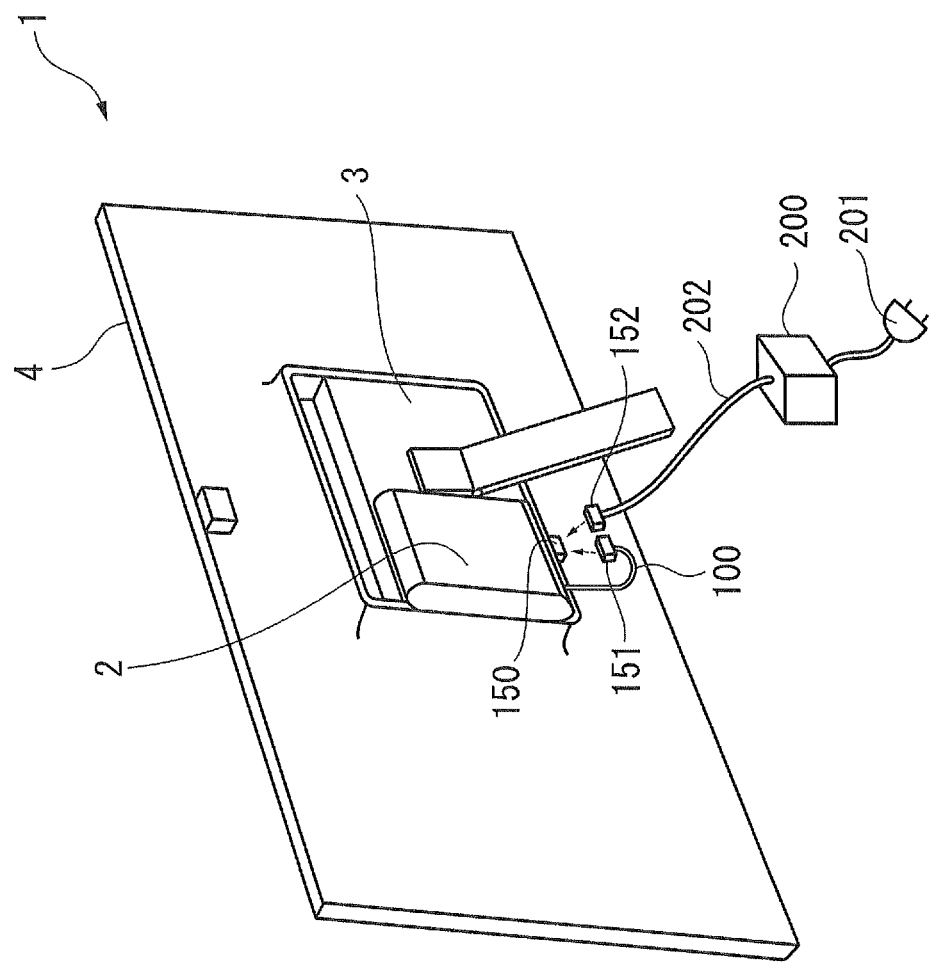
FIG. 1 A perspective view of a battery-driven liquid crystal monitor according to an embodiment of the present invention.

FIG. 1 is a perspective view of a battery-driven liquid crystal monitor (hereinafter, referred to as a liquid crystal monitor) according to one embodiment of the present invention.

A liquid crystal monitor 1 includes a power supply block 3 and a liquid crystal panel 4. The power supply block 3 is supplied with a DC voltage (hereinafter, referred to as an external DC voltage), output from any one of external power sources, from a battery unit 2 outputting a single voltage via a DC power supply line 100 or from an AC adaptor 200 via an AC power supply line 202. One end of the DC power supply line 100 is connected to an output terminal of the battery unit 2 while the other end is connected to a terminal 151. Additionally, one end of the AC power supply line 202 is connected to an output terminal of the AC adaptor 200 while the other end is connected to a terminal 152. For this reason, the power supply block 3 has a power input terminal 150 which is connectible in common to any one of the terminals 151 and 152; therefore, it is connectible to the DC power supply line 100 or the AC power supply line 202. A socket plug 201 of the AC adaptor 200 is plugged into an AC power socket (not shown).

Figure 2:
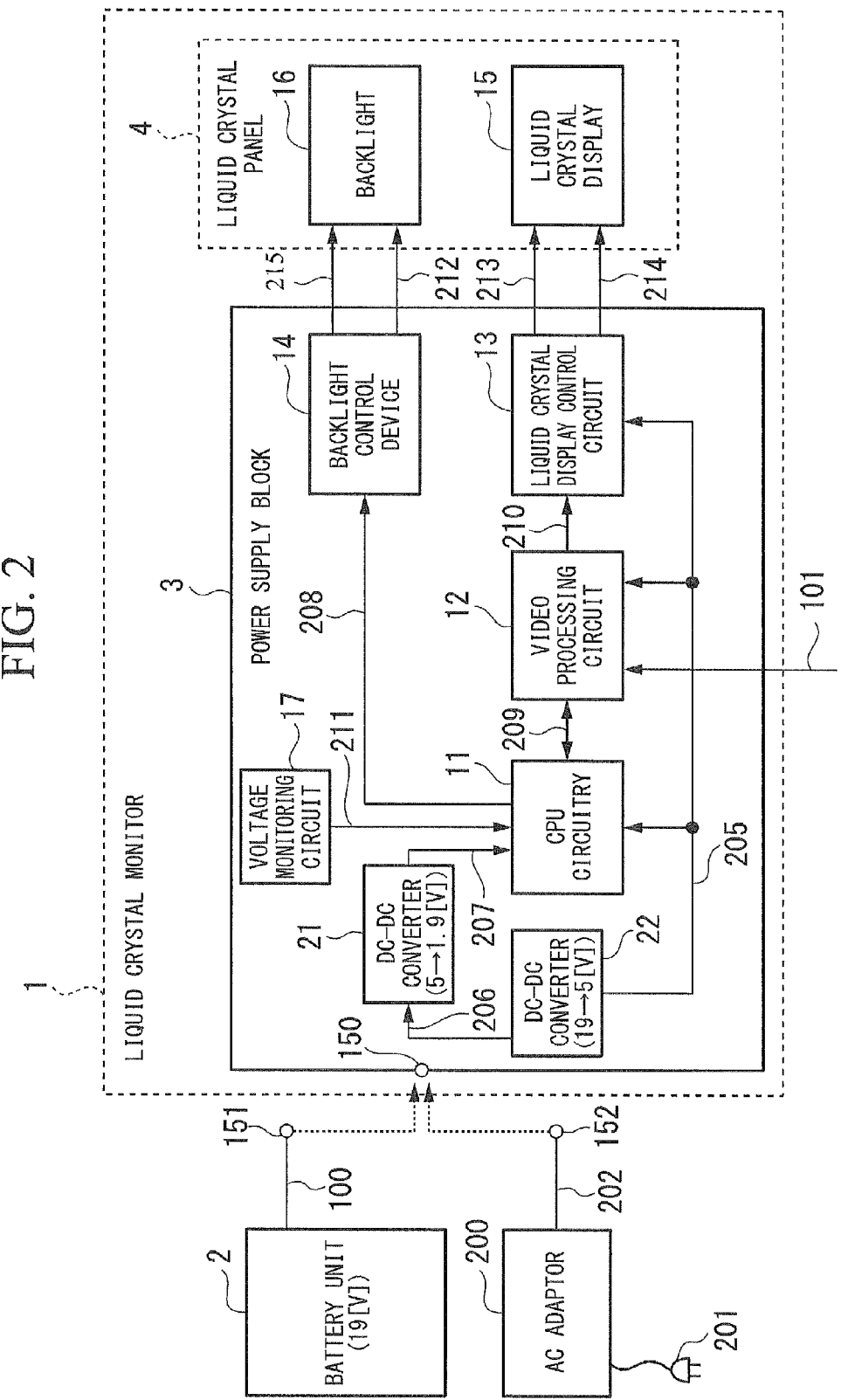
FIG. 2 An explanatory illustration showing a method for implementing the battery-driven liquid crystal monitor according to an embodiment of the present invention.
Figure 3:
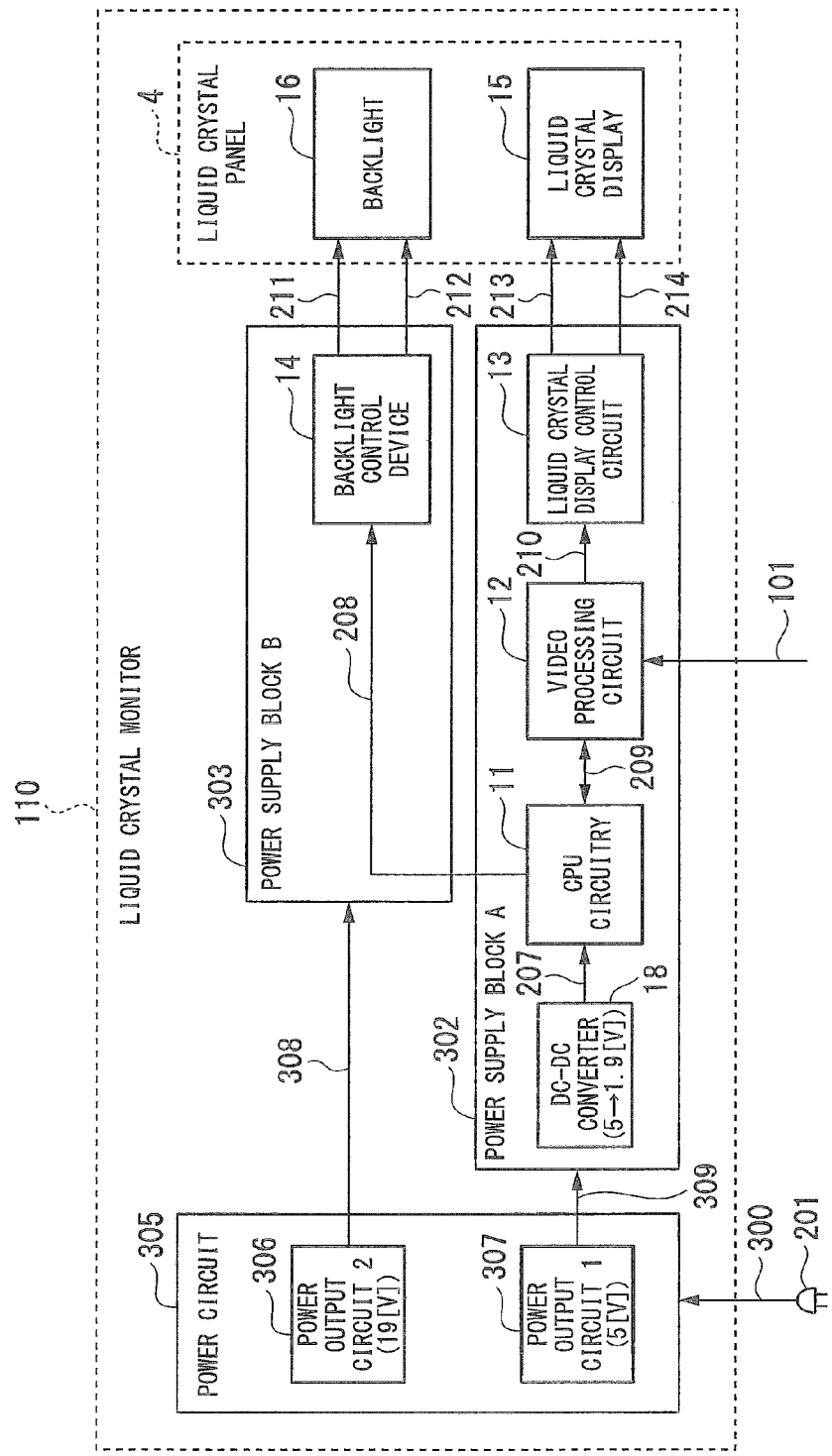
FIG. 3 An explanatory illustration showing a method for implementing a conventional battery-driven liquid crystal monitor.

FIG. 2 shows an example of the configuration of the liquid crystal monitor 1 according to the present embodiment. Parts identical to those of FIG. 3 are designated using the same reference symbols; hence, descriptions thereof will be precluded herein. In this drawing, the liquid crystal monitor 1 includes the power supply block 3 and the liquid crystal panel 4. The power supply block 3 includes the CPU circuitry 11, the video processing circuit 12, the liquid crystal display control circuit 13, the backlight control device 14, a power monitoring circuit 17, a DC/DC converter 21, and a DC/DC converter 22.

The battery unit 2 supplies a DC voltage of 19 V, as a first external DC voltage, to the power supply block 3 via a DC power supply line 100.

The AC adaptor 200 converts an AC voltage (e.g. a voltage ranging from 100 V to 240 V), which is supplied from an outlet socket via the socket plug 201, into a second external DC voltage, e.g. 19 V, which is supplied to the power supply block B 303, thus supplying it to the power supply block B 303 via a DC power supply line 202. The AC adaptor 200 sets the second external DC voltage (19 V) to the same value as the first external DC voltage (19 V) output from the battery unit 2. The present embodiment determines that the first external DC voltage may be equal to the second external DC voltage when a difference between the first external DC voltage and the second external DC voltage falls within a predetermined value, e.g. 3 V.

The DC/DC converter 22 is supplied with either the first external DC voltage output from the battery unit 2 or the second external DC voltage output from the AC adaptor 200 and reduces or converts the supplied external DC voltage into a first internal DC voltage, e.g. a voltage of 5 V, thus outputting it therefrom.

The DC/DC converter 22 supplies the first internal DC voltage (5 V), generated therein, to the DC/DC converter 21, the CPU circuitry 11, the video processing circuit 12, the liquid crystal display control circuit 13, the backlight control device 14, and the voltage monitoring circuit 17.

The backlight control device 14 boosts the first external DC voltage or the second external DC voltage, which is supplied from the power input terminal 150, so as to generate a second internal DC voltage (e.g. a voltage ranging from 40 V to 50 V), serving as a driving voltage for driving the backlight 16, thus supplying the second internal DC voltage to the backlight 16 via the backlight power supply line 212. For example, the backlight 16 is arranged in the backside of the display screen of the liquid crystal panel 4, which is composed of liquid crystal elements, in the liquid crystal display device 15. Thus, the backlight 16 irradiates light toward liquid crystal elements of the display screen at an illuminance specified by a backlight control signal given by the backlight control device 14.

The DC/DC converter 21 reduces or converts the first internal DC voltage, supplied thereto, into a third internal DC voltage which is needed to operate the CPU circuitry 11, e.g. a third internal DC voltage having a value of 1.9 V, thus supplying the third internal DC voltage to the CPU circuitry 11.

As described above, the external DC voltages, such as the first external DC voltage and the second external DC voltage, the first internal DC voltage, the second internal DC voltage, and the third internal DC voltage have a relationship in which the second internal DC voltage>the external DC voltage>the first internal DC voltage>the third internal DC voltage.

The CPU circuitry 11 is supplied with two voltages, i.e. the first internal DC voltage and the third internal DC voltage. The CPU circuitry 11, which operates based on the third internal DC voltage, utilizes the first internal DC voltage for the level conversion of voltage signals in order to send or receive control signals or data with the video processing circuit 12, the liquid crystal display control circuit 13, the backlight control device 14, and the voltage monitoring circuit 17.

The CPU circuitry 11 control processing of video input signals in the video processing circuit 12 based on programs stored in an internal memory. At this time, the CPU circuitry 11 is supplied with both the first internal DC voltage and the third internal DC voltage because it controls the levels of the signal lines, which are mutually connected to send or receive signals between chips therein, based on the third internal DC voltage while controlling the levels of the signal lines, which are mutually connected to send or receive signals with the backlight control device 14 and the video processing circuit 12, based on the first internal DC voltage.

The video processing circuit 12 performs processing to convert video input signals, supplied from an external device via the video input signal line 101, into video data (e.g. data representing RGB (Red, Green, Blue) gradation) displayed on the display screen of the liquid crystal panel 4.

The liquid crystal display control circuit 13 controls supplying video data, supplied from the video processing circuit 12, to a certain pixel position in the matrix alignment of liquid crystal elements in the liquid crystal display device 15.

The liquid crystal display device 15 writes video data, supplied from the liquid crystal display control circuit 13, into liquid crystal elements at a certain pixel position, thus displaying an image, corresponding to a video input signal, on the display screen of the liquid crystal panel 4.

The backlight control device 14 turns on the backlight 16 or controls an illuminance, corresponding to the gradation of video data, in the liquid crystal panel 4 based on a backlight control signal which is supplied from the CPU circuitry 11 via the backlight control line 208. The backlight control device 14, which installs a voltage conversion circuit such as a DC/DC converter therein, converts the first external DC voltage or the second external DC voltage (19 V), which is supplied from the power input terminal 150, into the second internal DC voltage, e.g. 40 V. The second internal DC voltage is supplied to an LED (Light Emitting Diode) or a cold-cathode fluorescent lamp in the backlight 16. Additionally, the backlight control device 14 controls a lighting illuminance on an LED or a cold-cathode fluorescent lamp in the backlight 16.

As described above, the present invention is designed to generate a plurality of DC voltages, which may be needed for internal circuitry, based on a single value of 19 V as an externally supplied DC voltage; hence, when a battery is used to supply a DC voltage, it is necessary to install a signal battery unit 2, outputting 19 V, which may suffice for the operation of the liquid crystal monitor 1. This eliminates the necessity of installing a plurality of batteries supplying DC voltages as necessary, and may reduce the number of batteries installed therein. Thus, it is possible to reduce the weight of the liquid crystal monitor 1 compared to one installing a plurality of batteries.

The present embodiment, which is directly supplied with an external DC voltage, does not need a power circuit for converting an AC voltage to a DC voltage, which is conventionally needed. Thus, it is possible to reduce the size and the weight of a liquid crystal monitor due to incompletion of a power circuit.

Since the first external DC voltage from the battery unit 2 is equalized with the second external DC voltage from the AC adaptor 200, the present embodiment needs a single DC/DC converter 22 for generating voltages, used for internal circuitry, based on either one voltage. That is, the DC/DC converter 22 can be used in common to generate the first internal DC voltage based on both the first external DC voltage and the second external DC voltage. Thus, it is possible to reduce the number of power conversion circuits.

The present embodiment is designed such that the first external DC voltage and the second external DC voltage are each set to a value of 19 V proximate to a center value between the third internal DC voltage and the second internal DC voltage because the DC/DC converter 21 generates the third DC voltage of 1.9 V supplied to the CPU circuitry 11 while the backlight control device 14 generates the second internal DC voltage, e.g. 40 V.

This is because energy efficiency may be reduced in conversion when the DC/DC converter 22 boosts or reduces a DC voltage while going through a great voltage difference in conversion, i.e. a great voltage difference between the first external DC voltage (or the second external DC voltage) and the first internal DC voltage or a great voltage difference between the first external DC voltage (or the second external DC voltage) and the second internal DC voltage. In order to reduce a voltage difference subjected to boost or reduction, it is necessary to set the first external DC voltage proximate to a center value between the boosted voltage and the reduced voltage, thus improving energy efficiency in boost and reduction.

Additionally, the present embodiment is equipped with the voltage monitoring circuit 17 for monitoring an externally supplied voltage. The voltage monitoring circuit 17 detects the value of an external DC voltage (i.e. the first external DC voltage or the second external DC voltage) supplied to the power supply block 3, thus determining whether the detected value is above or below the predetermined threshold voltage.

When the voltage supplied to the power supply block 3 is below the predetermined threshold voltage, the voltage monitoring circuit 17 outputs a voltage reduction signal to the CPU circuitry 11 via a voltage monitor signal line 215. The predetermined threshold voltage is determined by adding a margin, which is estimated based on an experimental value securing operation for a predetermined time, to a higher value corresponding to either a lower-limit value which the can be reduced to the internal DC voltage of 5 V in the DC/DC converter 22 or a lower-limit value which can be boosted to the second internal DC voltage of 40 V in the backlight control device 14.

At this time, the CPU circuitry 11, supplied with a voltage reduction signal from the voltage monitoring circuit 17, implements an OSD (On Screen Display) function to display an alarm (or warning) on the display screen of the liquid crystal panel 4, notifying that the externally supplied voltage, e.g. the first external DC voltage supplied from the battery unit 2 or the second external DC voltage from the AC adaptor 200, is not above the predetermined threshold voltage or below the threshold voltage.

Additionally, the voltage monitoring circuit 17 receives information, representing either the battery unit 2 or the AC adaptor 200 currently supplying the external DC voltage, from a switch circuit detecting either the battery unit 2 or the AC adaptor 200 being currently used, e.g. a switch circuit which is arranged in a section installing the battery unit 2 so as to detect presence or absence of the battery unit 2. Upon being supplied with an external DC voltage corresponding to the first external DC voltage from the battery unit 2, the voltage monitoring circuit 17 displays a notation, indicating the battery unit 2 currently supplying the first external DC voltage, in a similar manner of displaying an alarm by way of the OSD function while displaying an alarm. For example, the voltage monitoring circuit 17 outputs a control signal, indicating a low value of the first external DC voltage output from the battery unit 2 or the level of residual quantity in a battery mark, to the CPU circuitry 11.

Upon being supplied with the second external DC voltage from the AC adaptor 200, the voltage monitoring circuit 17 displays a notation, indicating the AC adaptor 200 currently supplying the second external DC voltage, in a similar manner of displaying an alarm by way of the OSD function while displaying an alarm. For example, the voltage monitoring circuit 17 outputs a control signal, indicating a low voltage value of the AC adaptor 200 or a socket plug, to the CPU circuitry 11.

INDUSTRIAL APPLICABILITY

When an electronic device, including internal circuitry which is driven using a plurality of DC voltages having different values, is driven using a single DC voltage from a battery unit, by way of the voltage conversion and the voltage setting of an external DC voltage according to the present embodiment, it is possible to reduce the number of battery units, similar to the present embodiment. It is possible to improve energy efficiency in converting a value of an external DC voltage, supplied from a battery unit, into a value of a DC voltage, used in the internal circuitry of an electronic device, thus increasing a battery life.

REFERENCE SIGNS LIST 1 liquid crystal monitor
2 battery unit
3 power supply block
4 liquid crystal panel
11 CPU circuitry
12 video processing circuit
13 liquid crystal display control circuit
15 liquid crystal display device
16 backlight
17 voltage monitoring circuit
21, 22 DC/DC converter
100 DC power supply line
101 video input signal line
150 power input terminal
151, 152 terminal
200 AC adaptor
201 socket plug
202 AC power supply line

The invention claimed is:

1. A liquid crystal monitor, comprising:
a first voltage conversion circuit configured to convert an external DC voltage, supplied from an external device, into a first internal DC voltage, which is supplied to a first internal circuit in the liquid crystal monitor; and
a second voltage conversion circuit configured to convert the external DC voltage into a second internal DC voltage, which drives a backlight of a liquid crystal panel in the liquid crystal monitor; and
a third voltage conversion circuit configured to convert the first internal DC voltage into a third internal DC voltage, which is supplied to a second internal circuit in the liquid crystal monitor,
wherein the external DC voltage is set close to a center value between the third internal DC voltage and the second internal DC voltage,
wherein the external DC voltage, the first internal DC voltage, the third internal DC voltage, and the second internal DC voltage have a relationship in which the second internal DC voltage>the external DC voltage>the first internal DC voltage>the third internal DC voltage, and
wherein each of the first voltage conversion circuit and the third voltage conversion circuit comprises a DC/DC converter.

2. The liquid crystal monitor according to claim 1, further comprising a voltage monitoring circuit which compares the external DC voltage with a predetermined threshold voltage so as to output a voltage reduction signal to the second internal circuit when the external DC voltage is lower than the predetermined threshold voltage, and
wherein the second internal circuit receiving the voltage reduction signal implements an OSD (On Screen Display) function to indicate lowness of the external DC voltage on the liquid crystal panel.

3. The liquid crystal monitor according to claim 1, wherein the first voltage conversion circuit and the second voltage conversion circuit are directly supplied with the external DC voltage.

4. The liquid crystal monitor according to claim 1, further comprising:
a CPU circuitry;
a video processing circuit;
a liquid crystal display control circuit; and
a voltage monitoring circuit,
wherein the first voltage conversion circuit supplies the first internal voltage to the third voltage conversion circuit, the CPU circuitry, the video processing circuit, the liquid crystal display control circuit, and the voltage monitoring circuit.

5. The liquid crystal monitor according to claim 4, wherein the CPU circuitry is supplied with the first internal voltage and the third internal voltage.

6. The liquid crystal monitor according to claim 5, wherein the CPU circuitry operates based on the third internal voltage, and utilizes the first internal voltage for a level conversion of voltage signals to send or receive control signals with the video processing circuit, the liquid crystal display control circuit, the second voltage conversion circuit, and the voltage monitoring circuit.

7. The liquid crystal monitor according to claim 6, wherein the CPU circuitry controls processing on video input signals in the video processing circuit based on programs stored in an internal memory.

8. The liquid crystal monitor according to claim 7, wherein the CPU circuitry controls levels of signal lines, which are mutually connected to send or receive signals between chips therein, based on the third internal voltage, while controlling levels of other signal lines, which are mutually connected to send or receive signals with the second voltage conversion circuit and the video processing circuit, based on the first internal voltage.

9. The liquid crystal monitor according to claim 8, wherein the video processing circuit performs processing to convert video input signals, supplied via a video input signal line, into video data displayed on a display screen of the liquid crystal panel.

10. The liquid crystal monitor according to claim 9, wherein the liquid crystal display control circuit controls supplying the video data, supplied from the video processing circuit, to a predetermined pixel position in a matrix alignment of liquid crystal elements in a liquid crystal display device.

11. The liquid crystal monitor according to claim 10, wherein the liquid crystal display device writes the video data, supplied from the video display control circuit, into the liquid crystal elements, to display an image, corresponding to the video input signals, on the display screen of the liquid crystal panel.

12. The liquid crystal monitor according to claim 11, wherein the second voltage conversion circuit turns on the backlight or controls an illuminance, corresponding to a gradation of the video data, in the liquid crystal panel based on a backlight control signal which is supplied from the CPU circuitry.

13. The liquid crystal monitor according to claim 12, wherein the second voltage conversion circuit installs a DC/DC converter to convert the external DC voltage into the second internal DC voltage.

14. The liquid crystal monitor according to claim 13, wherein the second internal DC voltage is supplied to an LED (Light Emitting Diode) or a cold-cathode fluorescent lamp in the backlight.

* * * * *